United States Patent
Saito et al.

(10) Patent No.: US 6,731,410 B2
(45) Date of Patent: May 4, 2004

(54) FACSIMILE COMMUNICATION METHOD AND FACSIMILE MACHINE

(75) Inventors: Kyoji Saito, Tokyo (JP); Kiyoshi Toyoda, Kunitachi (JP); Tatsuo Bando, Musashino (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 626 days.

(21) Appl. No.: 09/773,711

(22) Filed: Feb. 2, 2001

(65) Prior Publication Data

US 2002/0018245 A1 Feb. 14, 2002

Related U.S. Application Data

(63) Continuation of application No. 09/930,609, filed as application No. PCT/JP97/00694 on Mar. 6, 1997, now Pat. No. 6,208,426.

(30) Foreign Application Priority Data

Apr. 4, 1996 (JP) .............................. 8-082295

(51) Int. Cl.[7] .............................. H04N 1/40
(52) U.S. Cl. ...................... 358/468; 358/1.15; 358/402; 358/401; 358/404; 358/405; 379/100.01; 379/100.06
(58) Field of Search ................ 358/468, 405, 358/434, 524, 400, 401, 402, 442, 448, 453; 709/250, 206; 710/74

(56) References Cited

U.S. PATENT DOCUMENTS 4,837,635 A * 6/1989 Santos .......................... 358/401
4,837,798 A * 6/1989 Cohen et al. ............. 379/88.14
4,941,170 A * 7/1990 Herbst ................... 379/100.07

(List continued on next page.)

FOREIGN PATENT DOCUMENTS

| EP | 0471639 | 2/1992 |
|---|---|---|
| EP | 615377 | 9/1994 |
| JP | 1227575 | 9/1989 |

(List continued on next page.)

OTHER PUBLICATIONS

UNIX Magazine, vol. 9, No. 2, (1994) pp. 31–38, with a partial English Language Translation.
Pages 15–17 of "Using Netscape 2 Special Edition", by Mark Brown, published by Que Corporation, 1995.
English Language Abstract of JP 6–164645.
English Language Abstract of JP 7–212395.
English Language Abstract of JP–4–302256.
English Language Abstract of JP 6–30038.
English Language Abstract of JP 1–227575.

(List continued on next page.)

Primary Examiner—Kimberly Williams
Assistant Examiner—Tia Carter
(74) Attorney, Agent, or Firm—Greenblum & Bernstein, P.L.C.

(57) ABSTRACT

In a facsimile communication method for transmitting facsimile data to a reception terminal from a facsimile machine via a communication network, a transmission process in the facsimile machine includes the following steps: (a) a step of saving image data of an original to be transmitted as facsimile data in a storage; (b) a step of generating access information data for access to the image data, saved in the storage, from the reception terminal via the transmission network; (c) a step of sending the access information data to the reception terminal by an e-mail; and (d) a step of transmitting the image data in the storage to the reception terminal from the facsimile machine by a communication protocol of a point-to-point data transfer form upon reception of an access request for the image data from the reception terminal.

10 Claims, 18 Drawing Sheets

U.S. PATENT DOCUMENTS

| | | | | |
|---|---|---|---|---|
| 5,091,790 A | * | 2/1992 | Silverberg | 358/434 |
| 5,138,653 A | * | 8/1992 | Le Clercq | 379/93.24 |
| 5,293,250 A | * | 3/1994 | Okumura et al. | 358/402 |
| 5,299,255 A | * | 3/1994 | Iwaki et al. | 379/93.24 |
| 5,339,156 A | * | 8/1994 | Ishii | 358/402 |
| 5,404,231 A | * | 4/1995 | Bloomfield | 358/400 |
| 5,406,557 A | * | 4/1995 | Baudoin | 370/407 |
| 5,410,543 A | * | 4/1995 | Seitz et al. | 370/463 |
| 5,521,719 A | * | 5/1996 | Yamada | 358/438 |
| 5,552,901 A | * | 9/1996 | Kikuchi et al. | 358/468 |
| 5,557,736 A | * | 9/1996 | Hirosawa et al. | 714/4 |
| 5,577,108 A | * | 11/1996 | Mankovitz | 379/93.26 |
| 5,608,786 A | * | 3/1997 | Gordon | 370/352 |
| 5,675,507 A | * | 10/1997 | Bobo, II | 709/206 |
| 5,721,908 A | * | 2/1998 | Lagarde et al. | 707/10 |
| 5,737,395 A | * | 4/1998 | Irribarren | 379/88.13 |
| 5,751,971 A | * | 5/1998 | Dobbins et al. | 709/238 |
| 5,760,917 A | * | 6/1998 | Sheridan | 358/442 |
| 5,767,985 A | * | 6/1998 | Yamamoto et al. | 358/402 |
| 5,781,901 A | * | 7/1998 | Kuzma | 707/10 |
| 5,790,639 A | * | 8/1998 | Ranalli et al. | 379/100.08 |
| 5,793,497 A | * | 8/1998 | Funk | 358/402 |
| 5,793,498 A | * | 8/1998 | Scholl et al. | 358/434 |
| 5,805,298 A | * | 9/1998 | Ho et al. | 358/402 |
| 5,805,673 A | * | 9/1998 | Underwood et al. | 379/93.01 |
| 5,812,278 A | * | 9/1998 | Toyoda et al. | 358/402 |
| 5,848,413 A | * | 12/1998 | Wolff | 707/10 |
| 5,862,202 A | * | 1/1999 | Bashoura et al. | 379/100.14 |
| 5,881,233 A | * | 3/1999 | Toyoda et al. | 709/233 |
| 5,892,587 A | * | 4/1999 | Okada et al. | 358/402 |
| 5,903,723 A | * | 5/1999 | Beck et al. | 709/200 |
| 5,920,404 A | * | 7/1999 | Weiser | 358/434 |
| 5,991,514 A | | 11/1999 | Nielsen | 395/113 |
| 6,020,980 A | * | 2/2000 | Freeman | 358/402 |
| 6,057,938 A | * | 5/2000 | Abe et al. | 358/400 |
| 6,088,125 A | | 7/2000 | Okada et al. | 358/405 |
| 6,208,426 B1 | * | 3/2001 | Saito et al. | 358/1.15 |
| 6,211,972 B1 | | 4/2001 | Okutomi et al. | 358/402 |

FOREIGN PATENT DOCUMENTS

| | | |
|---|---|---|
| JP | 4302256 | 10/1992 |
| JP | 6-30038 | 2/1994 |
| JP | 6-30040 | 2/1994 |
| JP | 6-90252 | 3/1994 |
| JP | 6164645 | 6/1994 |
| JP | 7-74916 | 3/1995 |
| JP | 7193696 | 7/1995 |
| JP | 7212395 | 8/1995 |
| WO | 96/31826 | 10/1996 |
| WO | 96/34341 | 10/1996 |
| WO | 97/10668 | 3/1997 |

OTHER PUBLICATIONS

English Language Abstract of JP 6–30040.
English Language Abstract of JP 6–90252.
English Language Abstract of JP 7–193696.
English Language Abstract of JP 7–74916.
English Language Abstract of EP 615–377.
Pages 21 and 22 of "JAVA!" by Tim Richie, published by New Riders Publishing, 1995.
Pages 64–70 of an article entitled "The Multimedia Fax–MIME Gateway" by Sanjiv P. Patel, et al., which was published in IEEE MultiMedia, (vol. 1, No. 4, Dec. 21, 1994).

* cited by examiner

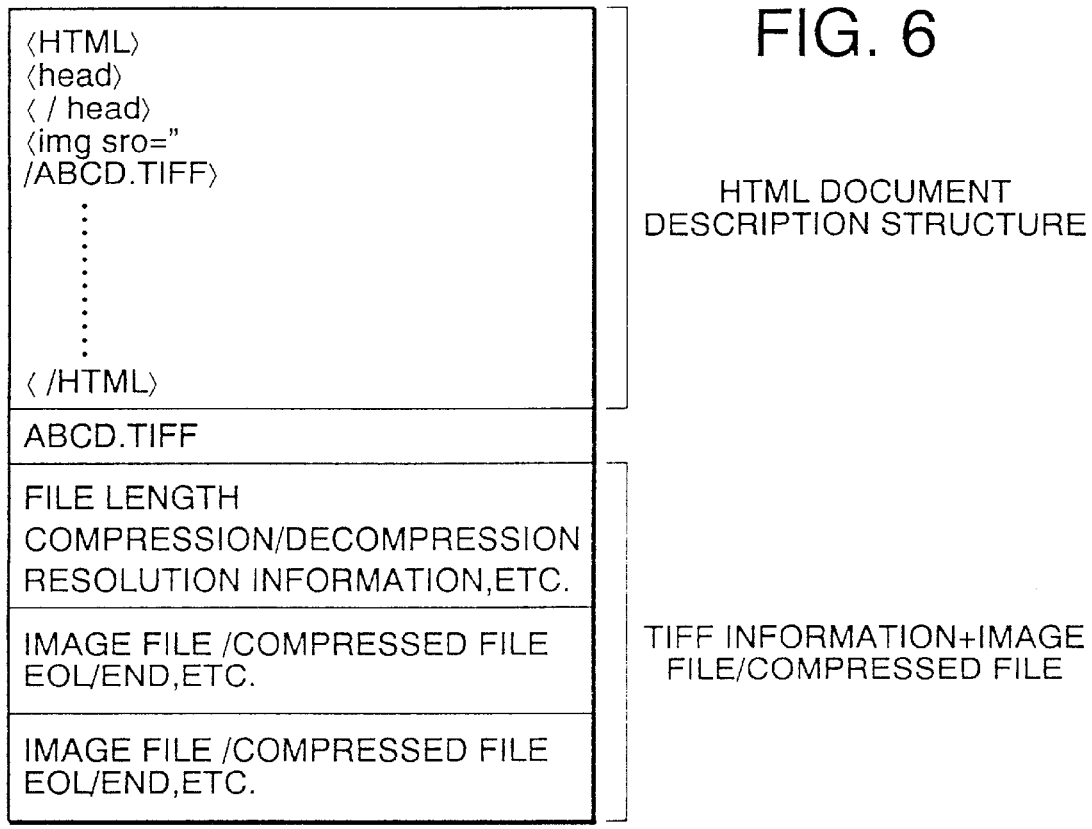

| USER DOMAIN INFORMATION OF TRANSMISSION DESTINATION | NAMES OF FILES TO BE TRANSMITTED | PASSWORDS |
|---|---|---|
| × × × × | fax 1 | × × × × |
| × × × × | fax 2 | ○ ○ ○ ○ |
| × × × × | fax 3 | × ○ ○ × |

ACCESS CONFIRMATION COLUMN

| DESTINATIONS OF MULTI – CAST | PRESENCE/ABSENCE OF ACCESS |
|---|---|
| × × × × | ○ |
| ○ ○ ○ ○ | ○ |
| ○ × × × | × |
| ○ ○ × × | × |

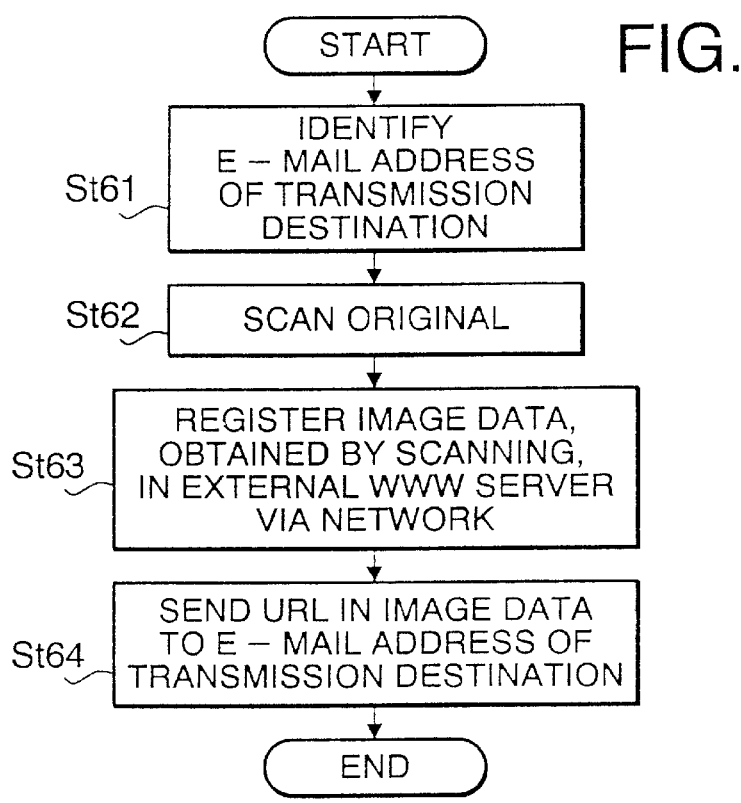
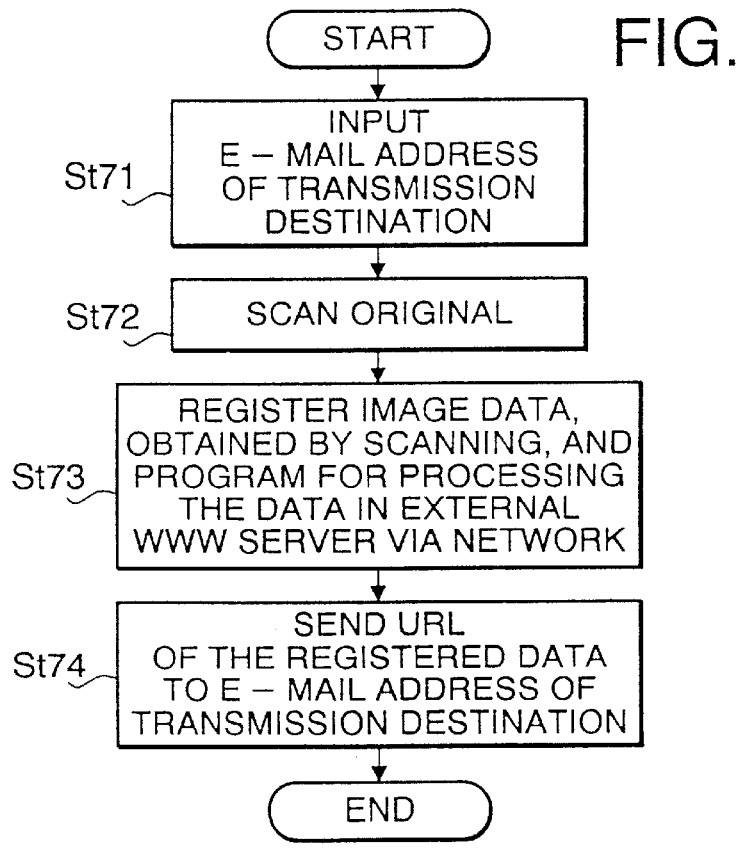

FACSIMILE COMMUNICATION METHOD AND FACSIMILE MACHINE

This is a continuation of U.S. application Ser. No. 08/930,609, filed Oct. 14, 1997 now U.S. Pat. No. 6,208, 426, which was the National Stage of International Application No. PCT/JP97/00694, filed Mar. 6, 1997, the contents of which are expressly incorporated by reference herein in their entireties. The International Application was not published in English.

TECHNICAL FIELD

The present invention relates to a data communication method for communicating data of a large size, such as a still picture, a moving picture and audio data, via a networks and, more particularly, to a facsimile communication method and a facsimile machine, which transmit image data like facsimile data using an e-mail system over a network.

BACKGROUND ART

Recently, for the efficiency of works in an office, an information processing apparatuses provided in the office are connected via a LAN (Local Area Network) installed in the office. A facsimile machine receives facsimile data which has been sent via a public telecommunication network from another facsimile machine. This facsimile machine converts the received facsimile data to an e-mail for a personal destination and transmits this e-mail to an information processing terminal on the LAN to which the facsimile machine is connected.

Unexamined Japanese Patent Publication No. Hei 6-164645 discloses a facsimile communication system which performs such facsimile communications.

FIG. 29 schematically illustrates the facsimile communication system disclosed in the Unexamined Japanese Patent Publication No. Hei 6-164645. A plurality of information processing terminals 182-1, 182-2 and 182-3 and a network connection type facsimile machine (NETFAX) 183 are connected to a LAN 181. The NETFAX 183 connects to an ISDN (Integrated Services Digital Network).

Another facsimile machine scans a transmission original to read the image data of the original. The image data read by this facsimile machine is sent to the information processing terminal 182-1 on the LAN via the ISDN 184. The facsimile machine transmits the image data via the ISDN 184 to the NETFAX 183 on the LAN with the telephone number of the NETFAX 183. At this time, the e-mail address of the information processing terminal 182-1 is set to a subaddress included in a number informing service provided by the ISDN and is transmitted simultaneously.

Upon reception of image data from the facsimile machine, the NETFAX 183 converts the received image data to the transmission format of an e-mail and sends it to the e-mail address of the information processing terminal 182-1 that has been input as the subaddress. In an existing e-mail system built on the LAN 181, an e-mail affixed with image data to be facsimiled is temporarily saved at a relay site or a reception site. That is, in the process of transmitting an e-mail (facsimile data including image data) to the information processing terminal 182-1 from the NETFAX 183, the e-mail including image data is temporarily saved at a relay site or a reception site on the network.

As facsimile data is image data read from a transmission original, however, it has a large data size. If facsimile data is color image data, the data size becomes larger. Facsimile data with a large data size has a problem of greatly using up the capacities of a relay site and a reception site.

In the case where the NETFAX 183 makes multi-casting of an e-mail of facsimile data to multiple information processing terminals on the network, the facsimile data which has a larger data size than an ordinary e-mail is transmitted to every site, there is a problem of increasing the traffic of the network.

DISCLOSURE OF INVENTION

It is therefore an object of the present invention to provide a facsimile communication method and a facsimile communication machine, which can significantly suppress an increase in the traffic on a network by transmitting facsimile data via a LAN, WAN, Internet or other networks, or which do not use up the memory resource at a relay site and a reception site for an e-mail.

A facsimile communication method according to this invention which transmits facsimile data to a reception terminal from a facsimile machine via a communication network, a transmission process in the facsimile machine including the following steps:

(a) a step of saving image data of an original to be transmitted as facsimile data in a storage;

(b) a step of generating access information data for access to the image data, saved in the storage, from the reception terminal via the communication network;

(c) a step of sending the access information data to the reception terminal by an e-mail; and (d) a step of transmitting the image data in the storage to the reception terminal from the facsimile machine by a communication protocol of a point-to-point data transfer form upon reception of an access request for the image data from the reception terminal.

A facsimile machine according to this invention acquires an e-mail address of a reception terminal, destined for the facsimile data, and saves image data of an original to be transmitted as facsimile data in a storage. Access information data for access to the image data, saved in the storage, from the reception terminal via the communication network is generated, and the access information data is sent to the e-mail address of the reception terminal by an e-mail. Upon reception of an access request for the image data from the reception terminal, the image data in the storage is transmitted to the reception terminal by a communication protocol of a point-to-point data transfer form.

According to this invention, only access information data for image data registered in a storage in a network is sent to a reception terminal by an e-mail, and image data is not sent directly to a transmission destination. Even in the case where large image data is transmitted to multiple destinations, therefore, it is unnecessary to send the same data to multiple sites so that the mail spools of destination sites are not occupied.

According to a facsimile communication method embodying this invention, a transmission process in a facsimile machine includes the following steps:

(a) a step of saving image data of an original to be transmitted as facsimile data in a server located on a network;

(b) a step of generating access information data for access to the image data, saved in the server, from the reception terminal via the communication network; and (c) a step of sending the access information data to the reception terminal by an e-mail.

Further, a process in the server includes the following steps:

(d) a step of saving the image data received from the facsimile machine; and (e) a step of transmitting the image data to the reception terminal by a communication protocol of a point-to-point data transfer form upon reception of an access request for the image data from the reception terminal.

A facsimile machine according to this invention acquires an e-mail address of a reception terminal on the communication network, and registers image data of an original to be transmitted as facsimile data in a server located on the communication network. Access information data for access to the image data, registered in the server, from the reception terminal via the communication network is generated, and the access information data is sent by e-mail to the e-mail address of the reception terminal. The server receives an access request sent out from the reception terminal and transmits the image data to the reception terminal by a communication protocol of a point-to-point data transfer form.

According to this invention, since it is unnecessary to register image data in a facsimile machine, a large-capacity hard disk can be removed from the facsimile machine so that the structure can be simplified.

BRIEF DESCRIPTION OF DRAWINGS

FIG. 6 is a structural diagram of image data turned into an HTML document;

FIG. 7 is a structural diagram of an e-mail for sending a URL;

FIG. 24 is a flowchart for image registration according to the seventh embodiment;

FIG. 25 is a flowchart for image registration according to the eighth embodiment;

BEST MODES FOR CARRYING OUT THE INVENTION

Embodiments of the present invention will now be described with reference to the drawings.

First Embodiment

Figure 1:
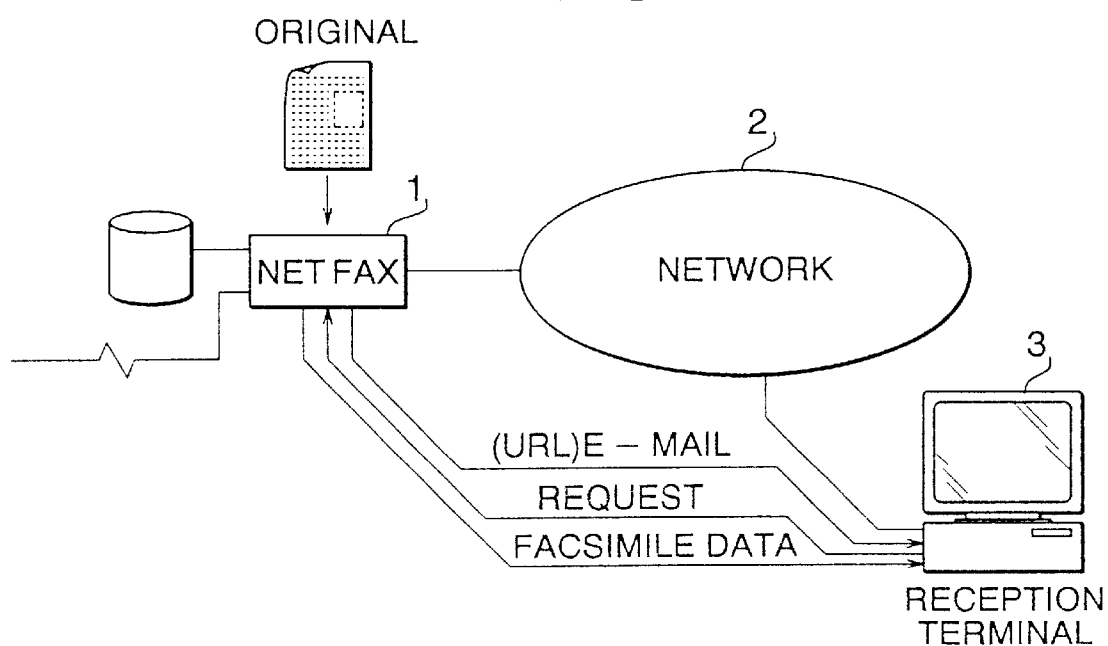
FIG. 1 is a schematic diagram of a facsimile communication system according to the first embodiment.

FIG. 1 schematically illustrates a facsimile communication system according to the first embodiment. A network connection type facsimile machine (NETFAX) 1 sends facsimile data to a reception terminal 3 via a communication network 2. The NETFAX 1 has a WWW (World Wide Web) server mechanism inside.

The NETFAX 1 scans an original after accepting the e-mail address of the reception terminal 3. The image data of the scanned original is registered in a storage of the internal WWW server mechanism after being converted to the form which is externally accessible as an HTML (Hyper Text Markup Language) document. Meantime, a URL (Uniform,Resource Locator) for the reception terminal 3 to access the image data of the NETFAX 1 via the communication network 2 is transmitted by e-mail to the reception terminal 3.

When requiring acquisition of image data, the reception terminal 3 accesses the WWW server mechanism of the NETFAX 1 using the URL in the received e-mail and acquires the necessary image data in accordance with a point-to-point communication protocol.

Figure 2:
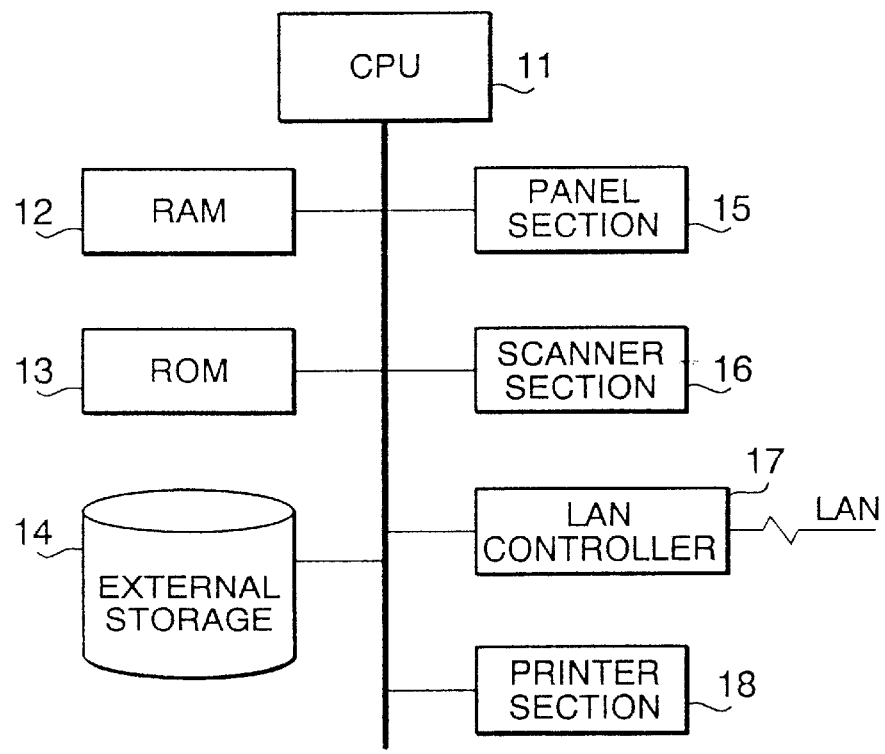
FIG. 2 is a functional block diagram of a NETFAX according to the first embodiment.

FIG. 2 is a functional block diagram of the NETFAX 1. In the NETFAX 1, a CPU 11 is connected to a RAM 12, a ROM 13, an external storage 14, a panel section 15, a scanner section 16, a LAN controller 17 and a printer section 18 via an internal bus. The NETFAX 1 is connectable to a public telecommunication network, though not illustrated, so that it can transmit and receive facsimile data.

Figure 4:
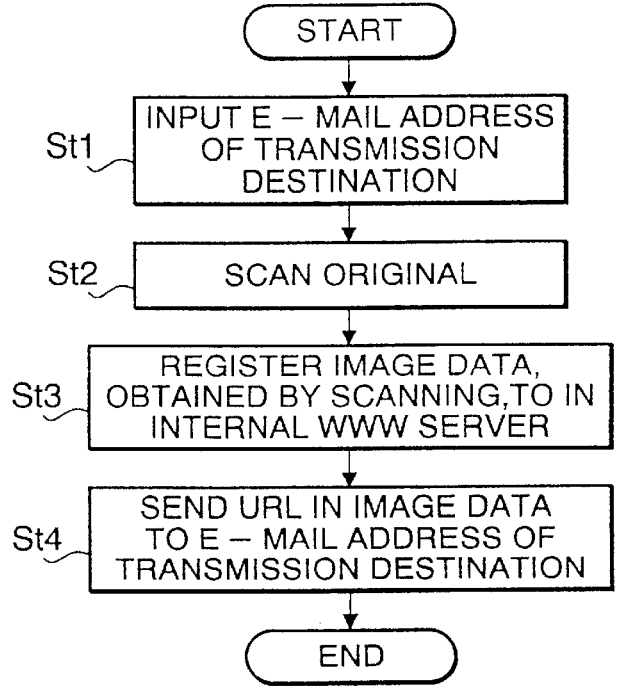
FIG. 4 is a flowchart of the first embodiment.

The CPU 11 manages the general operation of the facsimile machine and operates with respect to the transmission of image data in accordance with the flowchart illustrated in FIG. 4. A program which controls the operation of the CPU 11 is stored in the ROM 12. The RAM 13 is used as a work area for data processing associated with transmission and reception processes for image data. The external storage 14 is a secondary memory device which is typified by a hard disk, and is used to save image data which is sent as facsimile data. The panel section 15 is an operation panel through which alphabets, numerals and symbols can be input, and permits an operator to input an e-mail address and a telephone number, etc. The scanner section 16 scans a transmission original to convert it to image data. The LAN controller 17 is an interface between the NETFAX 1 and the network 2, and transmits and receives data via the network. The printer section 18 prints out image data received via the public telecommunication network or network.

Figure 3:
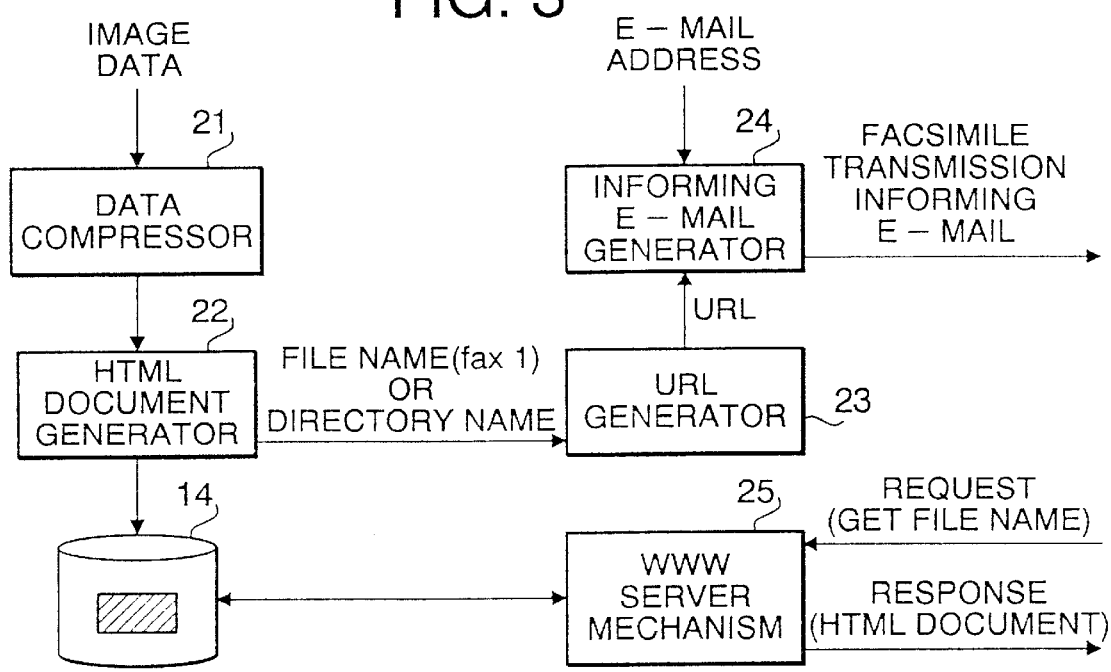
FIG. 3 is a functional block diagram of a CPU in the NETFAX.

FIG. 3 shows the structure of the functional blocks of the CPU 11. A data compressor 21 compresses the image data of a transmission original, scanned by the scanner section 16, or image data included in facsimile data received via the public telecommunication network, in the format of JPEG, TIFF or the like. An HTML document generator 22 converts compressed image data to an HTML document, affixes a file name thereto and saves it in the external storage 14. The file name and directory of the image data saved in the external storage 14 are given to a URL generator 23. The URL generator 23 generates a URL which consists of elements, such as a protocol for accessing image data saved in the external storage 14, a server name (NETFAX 1) on the Internet where image data to be transmitted as image data is located, and the directory and file name in the external storage 14 which is storing image data. An e-mail generator 24 receives an e-mail address of a transmission destination which is input through the panel section 15, or an e-mail address of a transmission destination specified by the sub-address of an ISDN line which has sent facsimile data. Then, the URL is transmitted to the e-mail address of the transmission destination to inform facsimile transmission. Meanwhile, a WWW server mechanism 25 equipped in the NETFAX 1 knows that the reception terminal 3 intends to access image data in the external storage using the URL. The WWW server mechanism 25 acquires image data from the external storage 14 in response to an access request received from the reception terminal 3, and directly sends it to the reception terminal 3 in accordance with the HTTP.

The operation of the thus constituted facsimile communication system will be described.

Figure 5:
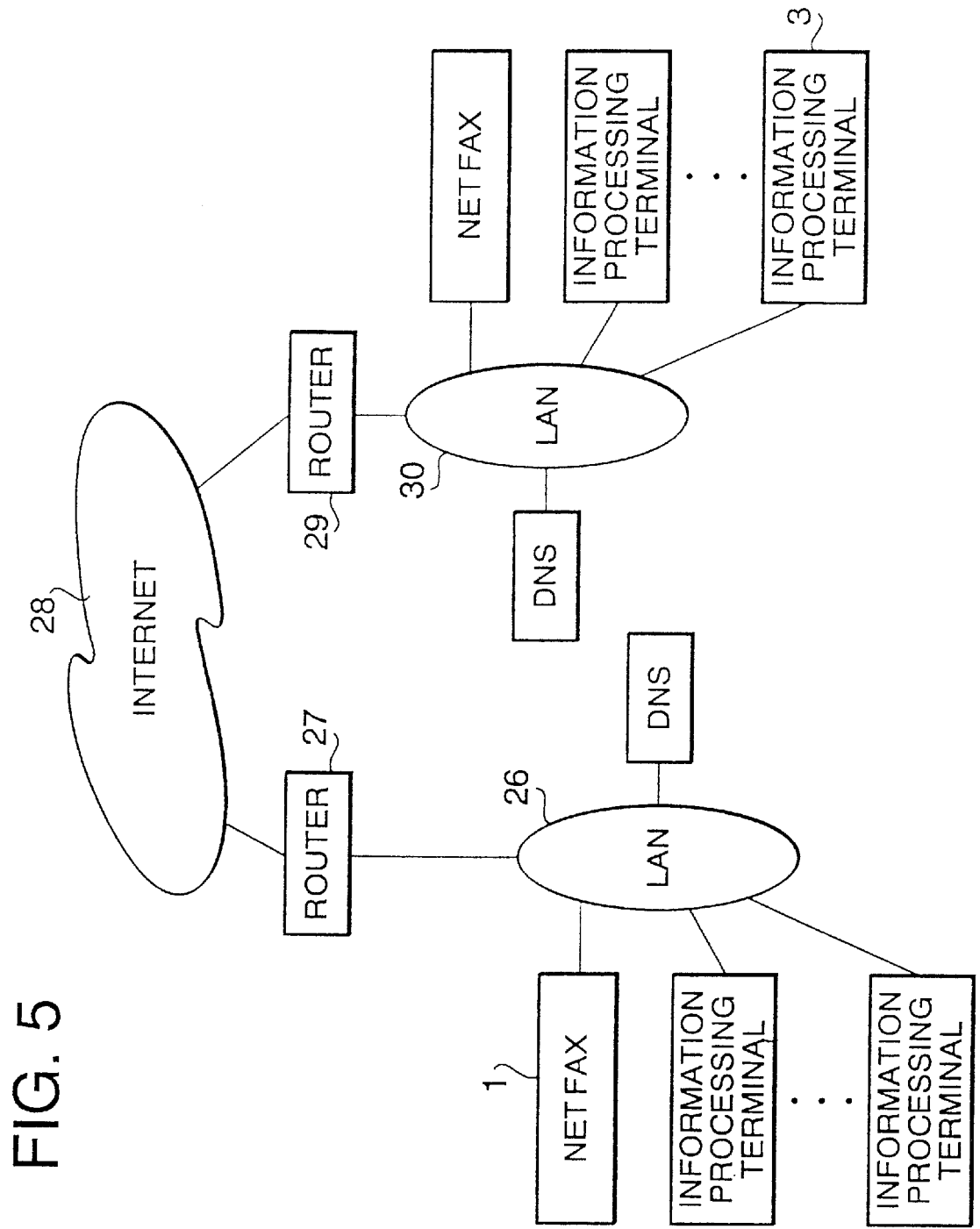
FIG. 5 is a diagram showing a network structure.

FIG. 4 is a flowchart for the transmission process of the NETFAX 1. As shown in FIG. 5, the NETFAX 1 is located within the network of a LAN 26, and can connect to an Internet 28 via a router 27. Meanwhile, the Internet 28 can reach another LAN 30 via a router 29. Connected within the network of the LAN 30 are a plurality of information processing terminals (including a facsimile) one of which becomes the reception terminal 3 that is the transmission destination of image data.

A description will be given of the case where the NETFAX 1 in the LAN 26 transmits image data via the Internet 28 to the reception terminal 3 in another LAN 30. First, the e-mail address of the transmission destination or the reception terminal 3 on the network, which has been input through the panel section 15 by an operator, is input (St 1). Next, the scanner section 16 scans a transmission original and converts it to image data (St 2). The image data of the transmission original with a file name affixed thereto is saved in the external storage 14 (hard disk) (St 3).

In the process from the scanning of the transmission original by the scanner section 16 to saving in the external storage 14, compression of image data and structuring of an HTML document are performed. As shown in FIG. 6, for example, image data is encoded in the TIFF format and this image data is structured into an HTML document. An HTML document can be accessed via a network by the point-to-point HTTP (Hyper Text Transfer Protocol).

An URL for access to image data registered in the external storage 14 is generated. As shown in FIG. 7, an e-mail is prepared in which the URL for access to image data registered in the external storage 14 is written in the text of the e-mail. This e-mail is transmitted to the reception terminal 3 using the SMTP (Simple Mail Transfer Protocol) (St 4).

The WWW server mechanism 25 receives a request for image data of the NETFAX 1 from the reception terminal 3. The WWW server mechanism 25 acquires image data (facsimile data) with the requested file name from the external storage 14, and transfers it to the IP address of the requesting reception terminal 3 using the HTTP.

When the NETFAX 1 relays the facsimile data received over the public telecommunication network to the reception terminal 2 on the network, image data is acquired from the facsimile data received through the public telecommunication network and is converted to an HTML document. This HTML document is saved in the external storage 14, and a URL for access to image data (HTML document) in the external storage 14 is transmitted by e-mail to the reception terminal 3.

According to the first embodiment, as apparent from the above, image data is saved in the external storage 14 in the form of an HTML document, only the access information data (URL) of the image data is sent by e-mail to the e-mail address of the transmission destination, and the reception terminal 3 accesses and acquires the image data of the NETFAX 1 by the HTTP, so that facsimile data (including image data) can be transferred to the reception terminal without going through a relay site and a reception site. This can prevent large image data from using up the capacity of the relay site and reception Site.

Second Embodiment

Figure 8:
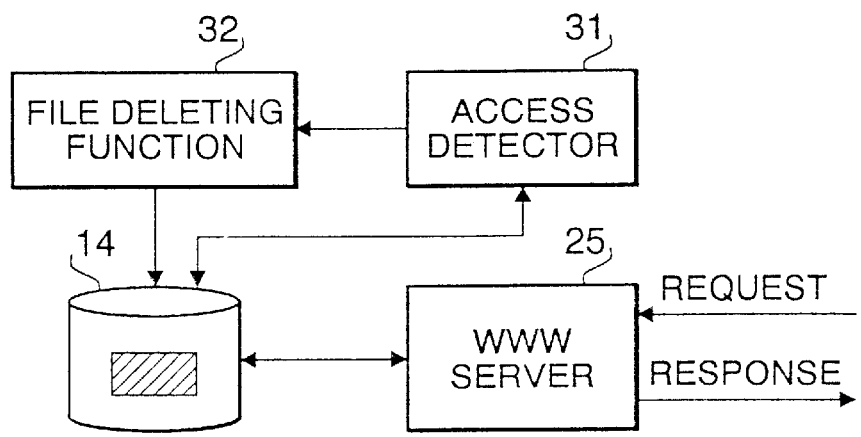
FIG. 8 is a functional block diagram associated with a file deleting function according to the second embodiment.

FIG. 8 shows a functional block diagram associated with a function of deleting image data, which becomes unnecessary, from the storage. The fundamental system structure is the same as that of the first embodiment, except for the function of deleting image data from the storage.

When there is access to image data saved in the external storage 14, the WWW server mechanism 25 leaves a log for the accessed file. An access detector 31 searches the log from the external storage 14 to identify the accessed image data.

A file deleting function 32 receives the directory and file name of image data, which has been externally accessed, from the access detector 31 and deletes this image data from the external storage 14.

Figure 9:
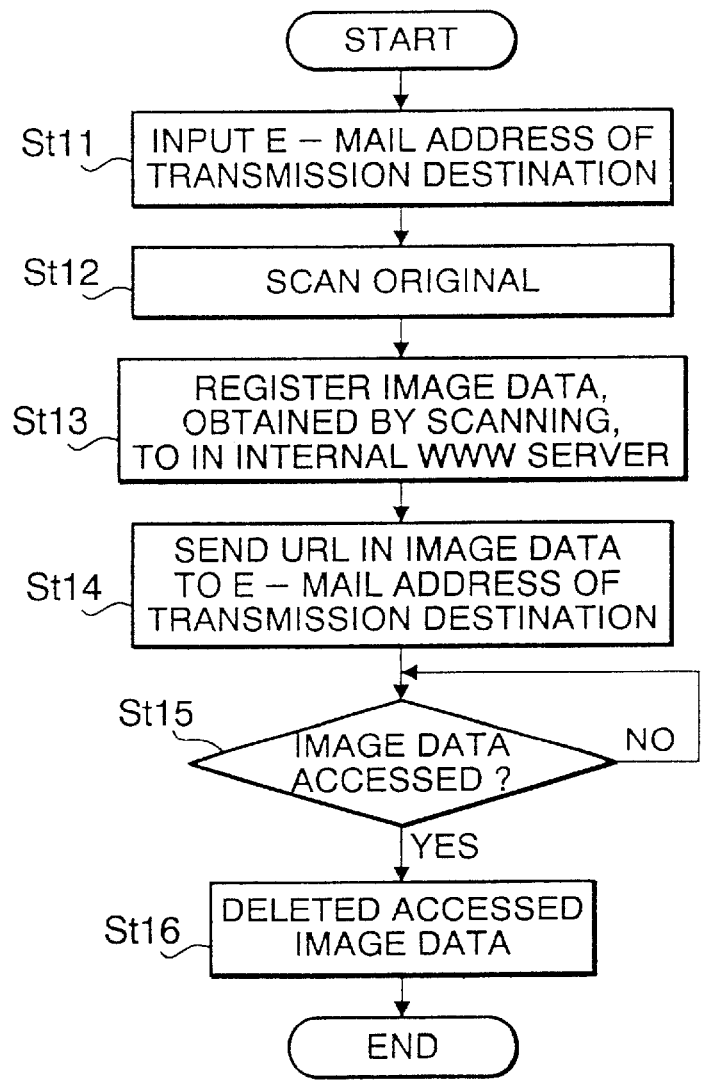
FIG. 9 is a flowchart of the second embodiment.

FIG. 9 shows a flowchart associated with facsimile data transmitting and deleting processes in the NETFAX 1. The processes (St 11 to St 14) from the identification of the e-mail address of the transmission destination, input through the panel section 15 by an operator, to the transmission of the image data of a transmission original to the e-mail address of the transmission destination are the same as those of the first embodiment. Specifically, after the e-mail address of the transmission destination is identified (St 11), the transmission original is scanned by the scanner section 16 (St 12), the image data scanned by the scanner section 6 is registered in the external storage 14 (St 13), and the URL of the image data registered in the external storage 14 is transmitted to the e-mail address of the transmission destination (St 14).

The access detector 32 searches the log, left in the external storage 14 by the WWW server mechanism 25, to monitor whether or not access to the image data registered in the external storage 14 has been made from outside (St 15). The file deleting function 32 which has been informed of the file name, etc. of the externally accessed image data deletes this image data from the external storage 14 (St 16).

Since the accessed image data is deleted from the external storage 14 after detecting that the facsimile data (image data) saved in the external storage 14 has been accessed from outside as apparent from the above, it is possible to prevent image data which has become unnecessary from remaining in the external storage 14 for a long time, thus ensuring the efficient use of the area of a hard disk.

Third Embodiment

Figure 10:
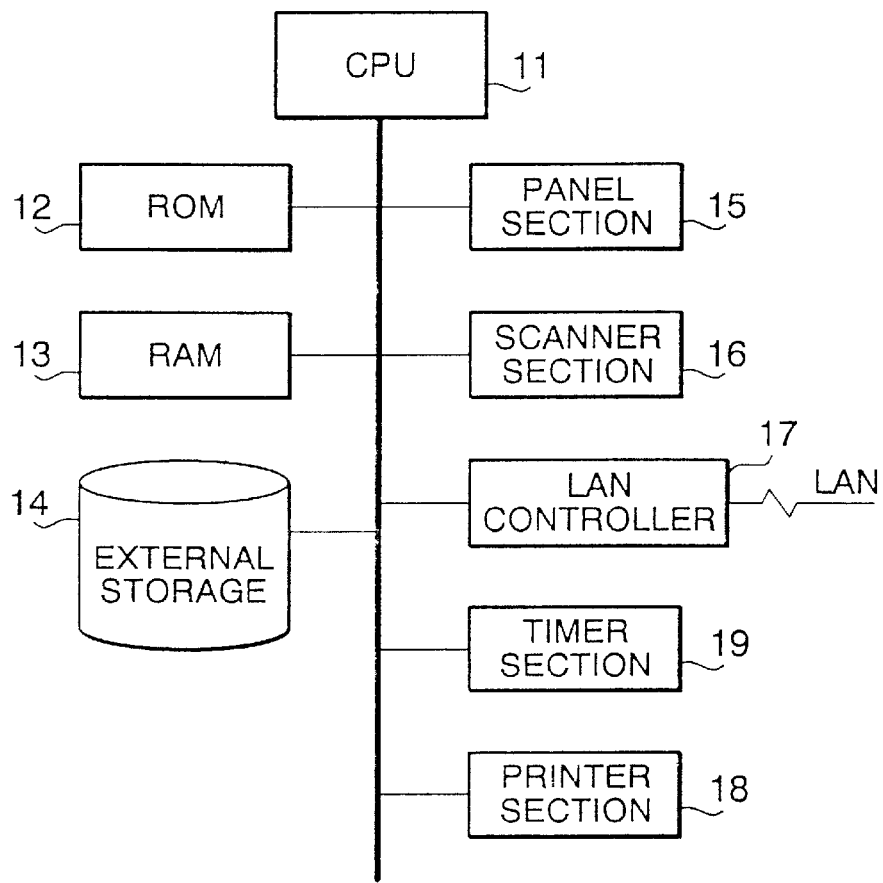
FIG. 10 is a functional block diagram of a NETFAX according to the third embodiment.

FIG. 10 shows the functional blocks of a NETFAX according to the third embodiment. The basic system structure is the same as those of the first and second embodiments. The NETFAX is provided with a timer section 19 for measuring the time that has elapsed since the registration of image data in the external storage 14.

Figure 11:
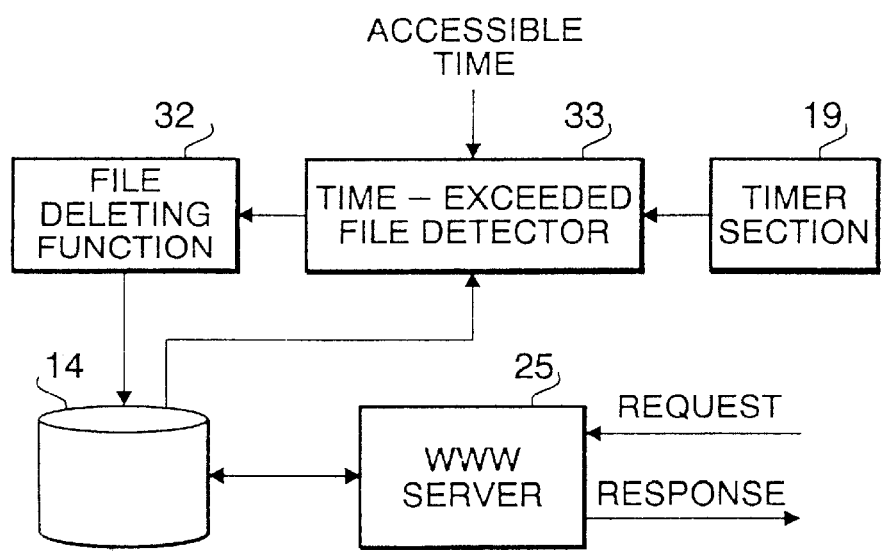
FIG. 11 is a functional block diagram associated with a file deleting function according to the third embodiment.

FIG. 11 depicts the functional blocks of the portion that is associated with a function of deleting image data. A time-exceeded file detector 33 manages an accessible time input through the panel section 15 by an operator. As the time-exceeded file detector 33 informs the file deleting function 32 of the file name of the image data whose accessible time has been exceeded, the file deleting function 32 deletes the image data from the external storage 14.

Figure 12:
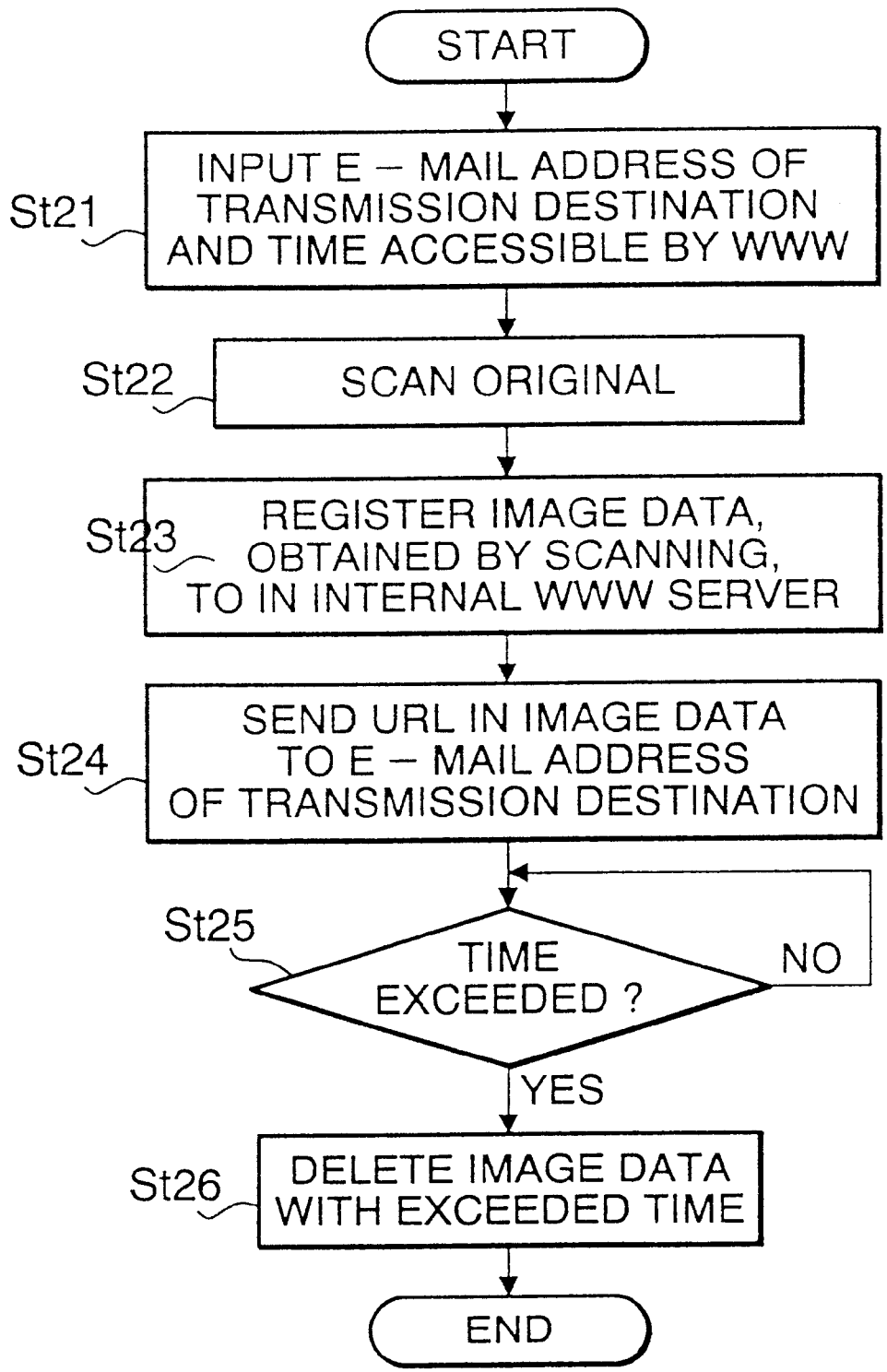
FIG. 12 is a flowchart of the third embodiment.

FIG. 12 illustrates a flowchart about image data transmitting and deleting processes in the NETFAX. The time in which the e-mail address of the transmission destination, input through the panel section 15 by the operator, and image data to be transmitted are held in the external storage 14 are identified (St 21).

As in the first embodiment, the transmission original is scanned by the scanner section 16 (St 22), the image data scanned by the scanner section 16 is registered in the external storage 14 (St 23), and the URL of the image data registered in the external storage 14 is transmitted to the e-mail address of the transmission destination (St 24).

The time-exceeded file detector 33 compares the time elapsed since the registration of the image data saved in the external storage 14 with the accessible time for this image data (St 25). When there is a file of image data with the elapsed time exceeding the accessible time, the file deleting function 32 is informed of its file name and it is deleted from the external storage 14 (St 26).

Because the accessible time of image data registered in the external storage is managed and the image data whose accessible time is reached is deleted, it is possible to prevent image data which has become unnecessary from remaining in the external storage 14 for a long time and occupying the area in a hard disk.

Fourth Embodiment

Figures 13, 14:
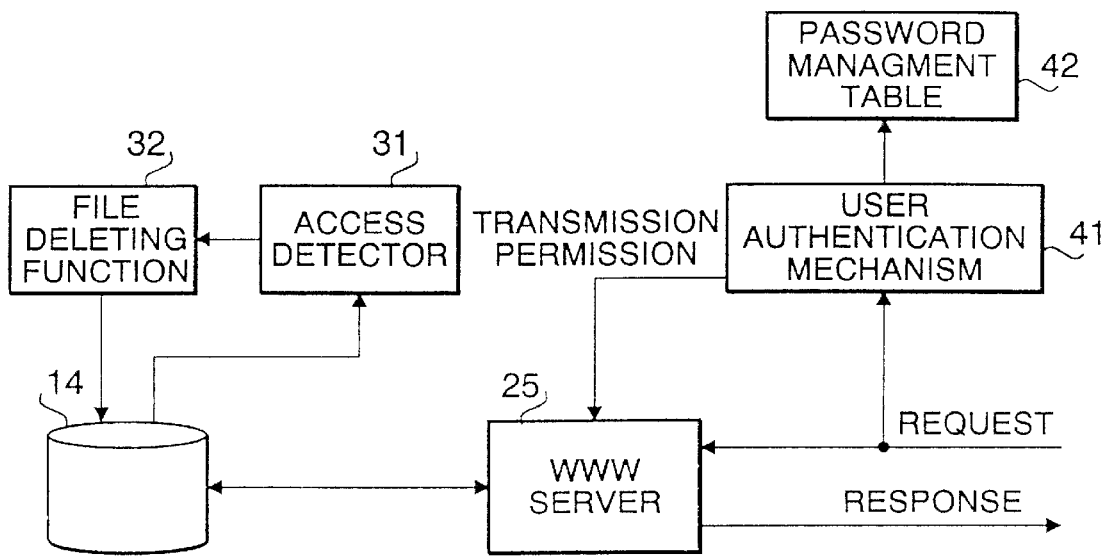
FIG. 13 is a functional block diagram associated with a user authentication function according to the fourth embodiment.
FIG. 14 is a structural diagram of a password management table according to the fourth embodiment.

FIG. 13 shows the functional blocks of a function of authenticating a user who has requested access to image data and a file deleting function of the NETFAX. The NETFAX is equipped with a user authentication mechanism 41 which authenticates a user who has requested access to image data. The user authentication mechanism 41 refers to a password management table 42 to discriminate if the access request has come from a person who wanted to transmit image data.

FIG. 14 shows the structure of the password management table 42. Set in the password management table 42 are address information of users of transmission destinations, the names of files where image data are saved, and passwords. The informing e-mail generator 24 inserts a password in an e-mail in addition to a URL. The password may be the one input through the panel section 15 by an operator or the one which is mechanically assigned by the informing e-mail generator 24.

Figure 15:
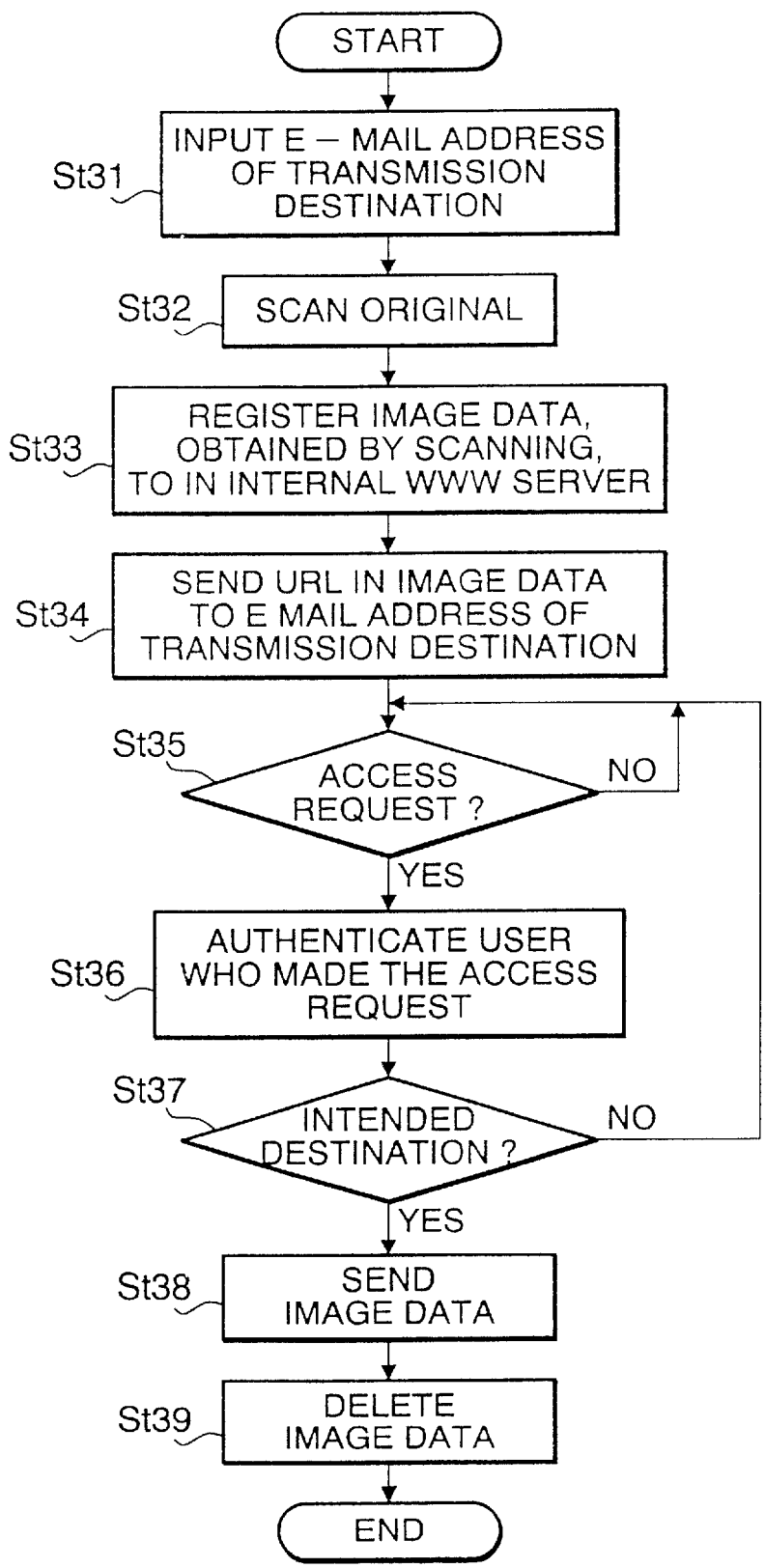
FIG. 15 is a flowchart of the fourth embodiment.

FIG. 15 presents a flowchart from the input of the e-mail address of a transmission destination to the deletion of transmitted image data. As in the first embodiment, the e-mail address of the transmission destination input through the panel section 15 by the operator is identified (St 31), the transmission original is scanned by the scanner section 16 (St 32), and the image data scanned by the scanner section 16 is registered in the external storage 14 (St 33).

A password is added to an e-mail by which a URL for accessing image data registered in the external storage 14 is to be transmitted, and the e-mail is sent to the e-mail address of the transmission destination (St 34).

At the time of accessing image data using the URL affixed to the e-mail, the reception terminal 3 also sends the password affixed to that URL.

When detecting an access request from a data stream from the LAN 25 (St 35), the user authentication mechanism 41 acquires the password of the user, who has made an access request, from the password management table 42 for authentication (St 36). When the passwords match with each other, the user having made the access request is permitted to access (St 37). As a result, the WWW server mechanism 25 transmits the image data (HTML document) in the external storage 14 to the user having made the access request in accordance with the HTTP (St 38). The image data which has been accessed externally is deleted from the external storage 14 by the file deleting function 32 (St 39).

As apparent from the above, the provision of the mechanism which authenticates the user who has made an access request can permit image data to be sent only to a specific person by the WWW server which is used by unspecified individuals.

As the names of files to be transmitted can be registered in the password management table 42 as shown in FIG. 14, it is possible to authenticate users who have made access requests file by file.

Fifth Embodiment

Figures 16, 17:
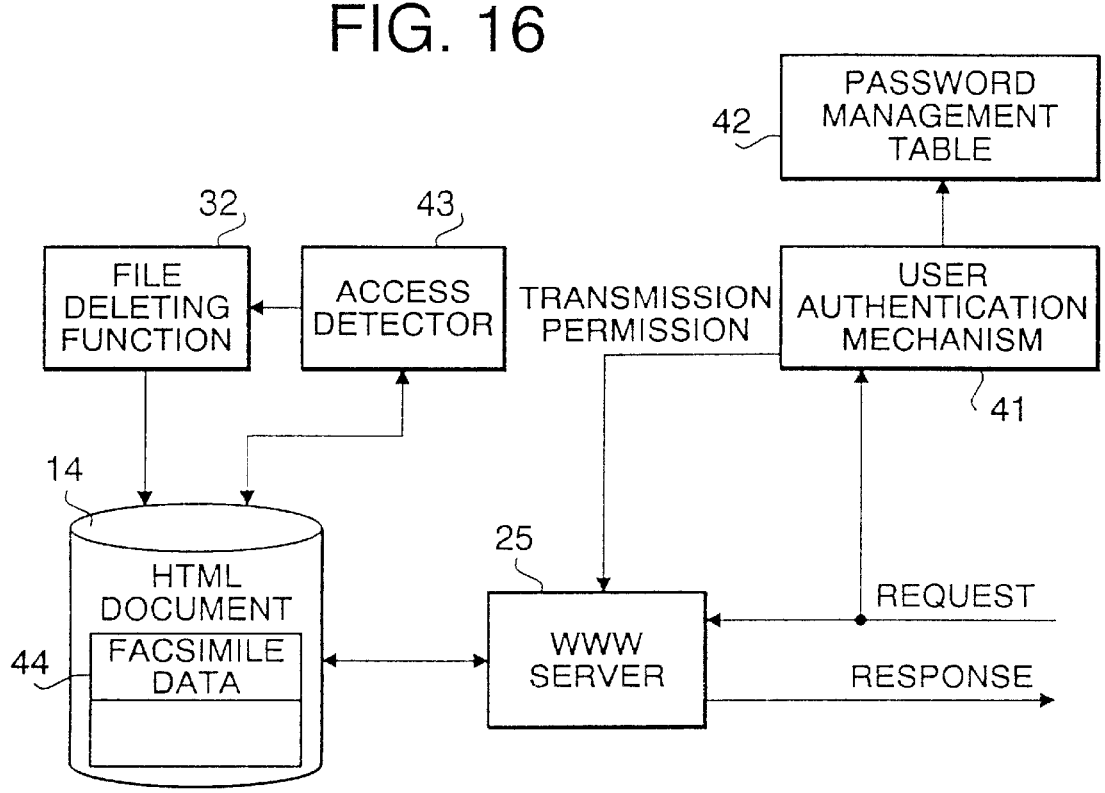
FIG. 16 is a functional block diagram associated with a user authentication function according to the fifth embodiment.
FIG. 17 is a structural diagram of an access confirmation column according to the fifth embodiment.

FIG. 16 depicts the functional blocks associated with an access confirming function and a user authentication function of the NETFAX. An access confirmation column 44 is affixed to image data, which should be transmitted to multiple destinations and is saved in the external storage 14. FIG. 17 shows the structure of the access confirmation column 44. An access detector 43 searches the log the WWW server mechanism 25 leaves with respect to the accessed file, and, upon detection of a destination for multi-casting, checks the associated portion in the access confirmation column 44. When all the destinations for multi-casting, registered in the access confirmation column 44, are checked, its image data is deleted.

Figure 18:
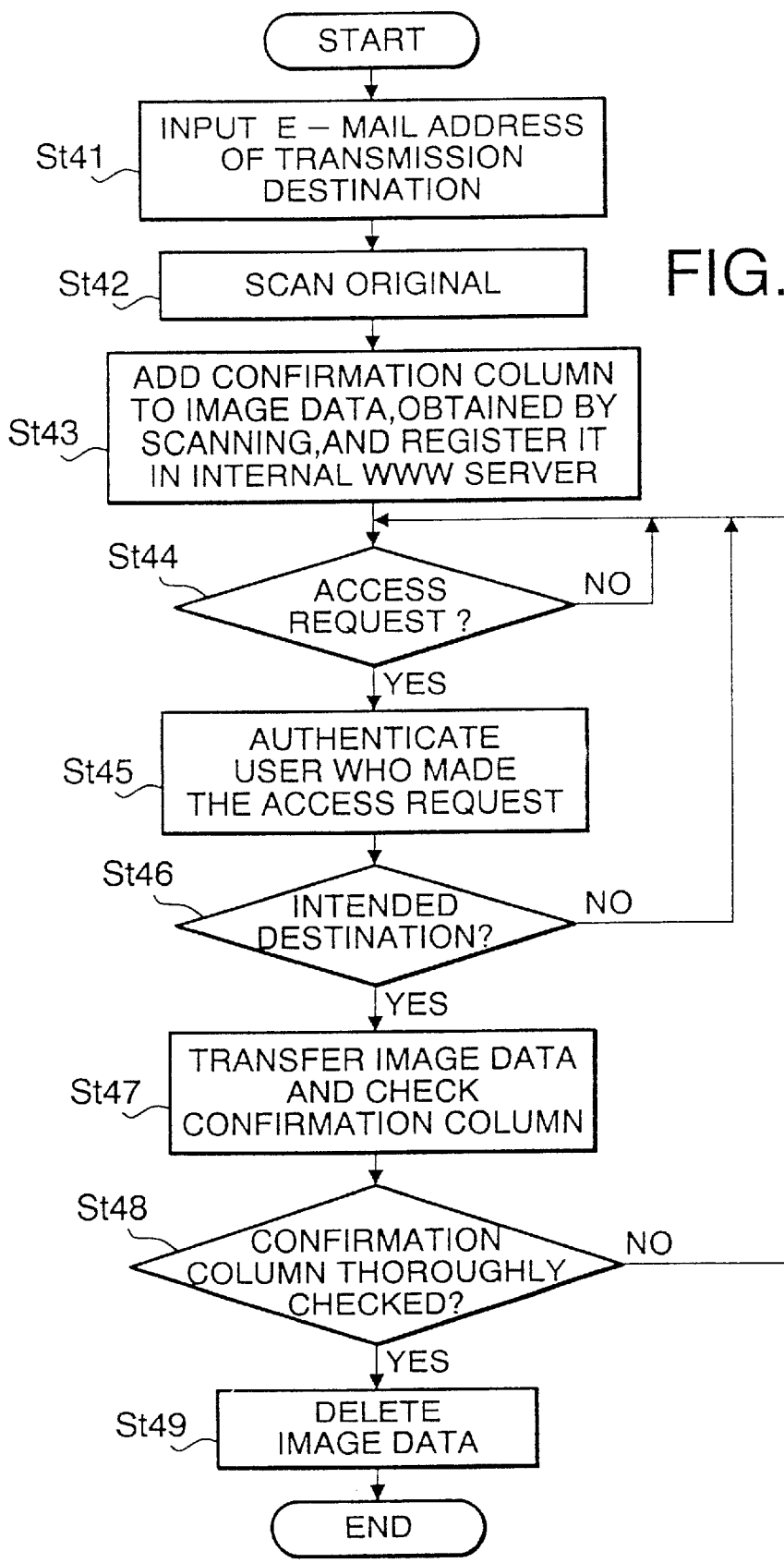
FIG. 18 is a flowchart of the fifth embodiment.

FIG. 18 is a flowchart from the input of an e-mail address to the deletion of data after checking access.

First, when the e-mail address of the transmission destination is input (St 41), the original is scanned to be converted to image data (St 42). Next, the access confirmation column 44 is affixed to the image data acquired through scanning and is registered in the external storage 14 (St 43). When multi-casting is specified, the access confirmation column 44 where destinations for multi-casting associated with the e-mail addresses of the destinations for multi-casting have been registered is affixed to the image data. This is accomplished by the HTML description.

When there is access to image data thereafter (St 44), the same authentication as done in the fourth embodiment is carried out (St 45, St 46). If the access request has come from a destination for multi-casting, the WWW server mechanism 25 transmits image data according to the HTTP. When the access detector 43 checks the log and identifies the transmission destination which has accessed the image data, it sets a flag indicating the access event in the associated portion in the access confirmation column 44 (St 47).

At the time the access confirmation column 44 is thoroughly checked (St 48), it is understood that all the destinations for multi-casting could have accessed the image data, so that this image data is deleted then (St 49).

Since the access confirmation column 44 having destinations for multi-casting registered therein is affixed to image data and saved, it is determined that every destination for multi-casting has confirmed the data upon detection of the access confirmation column 44 being thoroughly checked, and the data is then deleted, it is possible to prevent data from being stored unnecessarily and also prevent the data from being deleted without being sent to predetermined persons.

Sixth Embodiment

Figure 19:
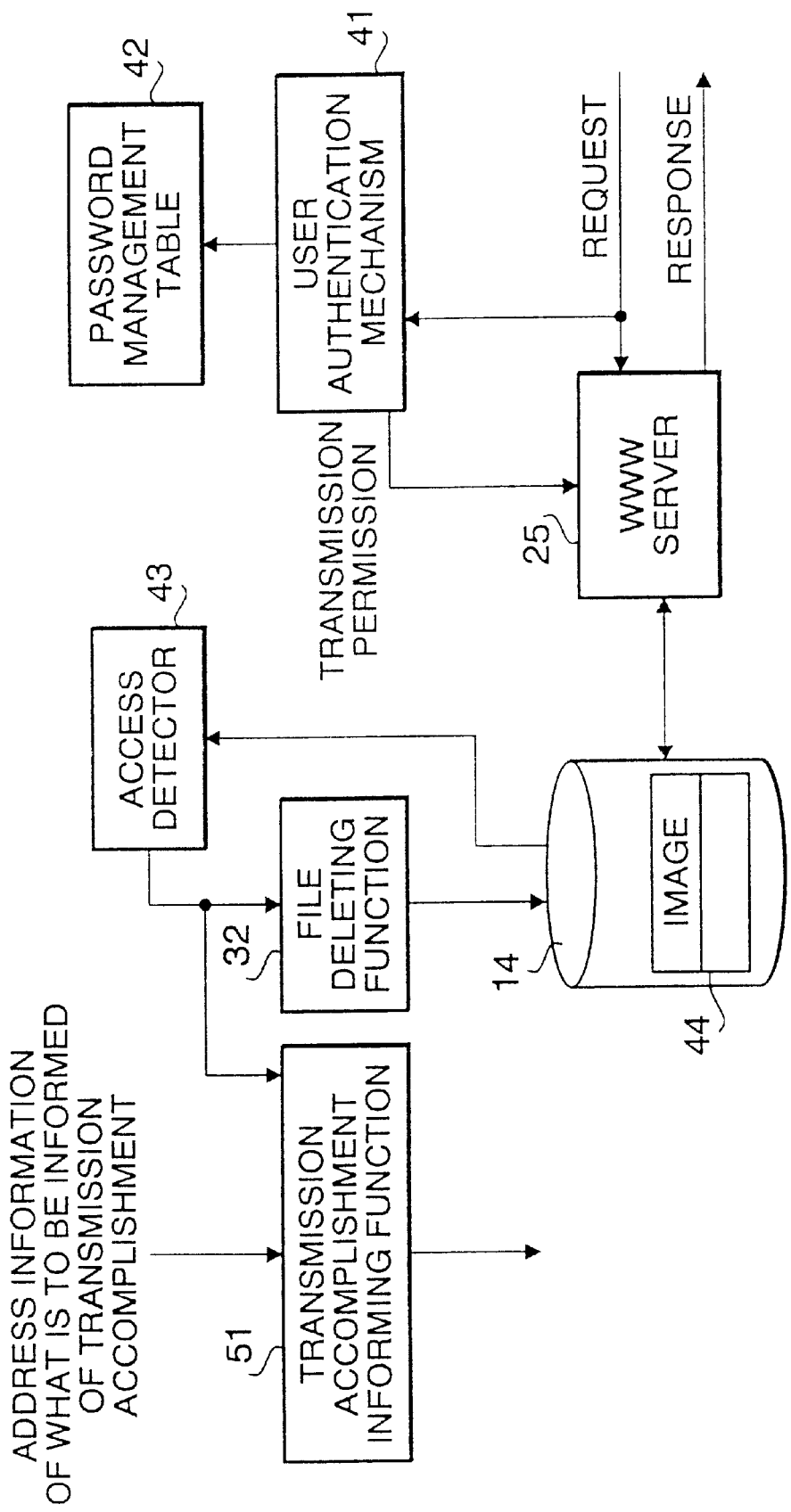
FIG. 19 is a functional block diagram associated with a transmission accomplishment informing function according to the sixth embodiment.

FIG. 19 presents a functional block diagram for the NETFAX to inform other information processing terminals on a network of the accomplishment of transmission of image data.

As in the fifth embodiment, the access confirmation column 44 is affixed to image data to be saved in the external storage 14, and the access detector 45 checks the access confirmation column 44 and recognizes that all the destinations for multi-casting have accessed.

Further, the address information of information processing terminals which are to be informed of the accomplishment of transmission by a transmission accomplishment informing function 51. The address information may be input through the panel section 15 by an operator or may be informed by a transmission scheme such as an e-mail. When informed of access being made by all the destinations for multi-casting from the access detector 45, the transmission accomplishment informing function 51 makes acknowledgement to that effect to the addresses of the information processing terminals at the destinations for multi-casting.

Figure 20:
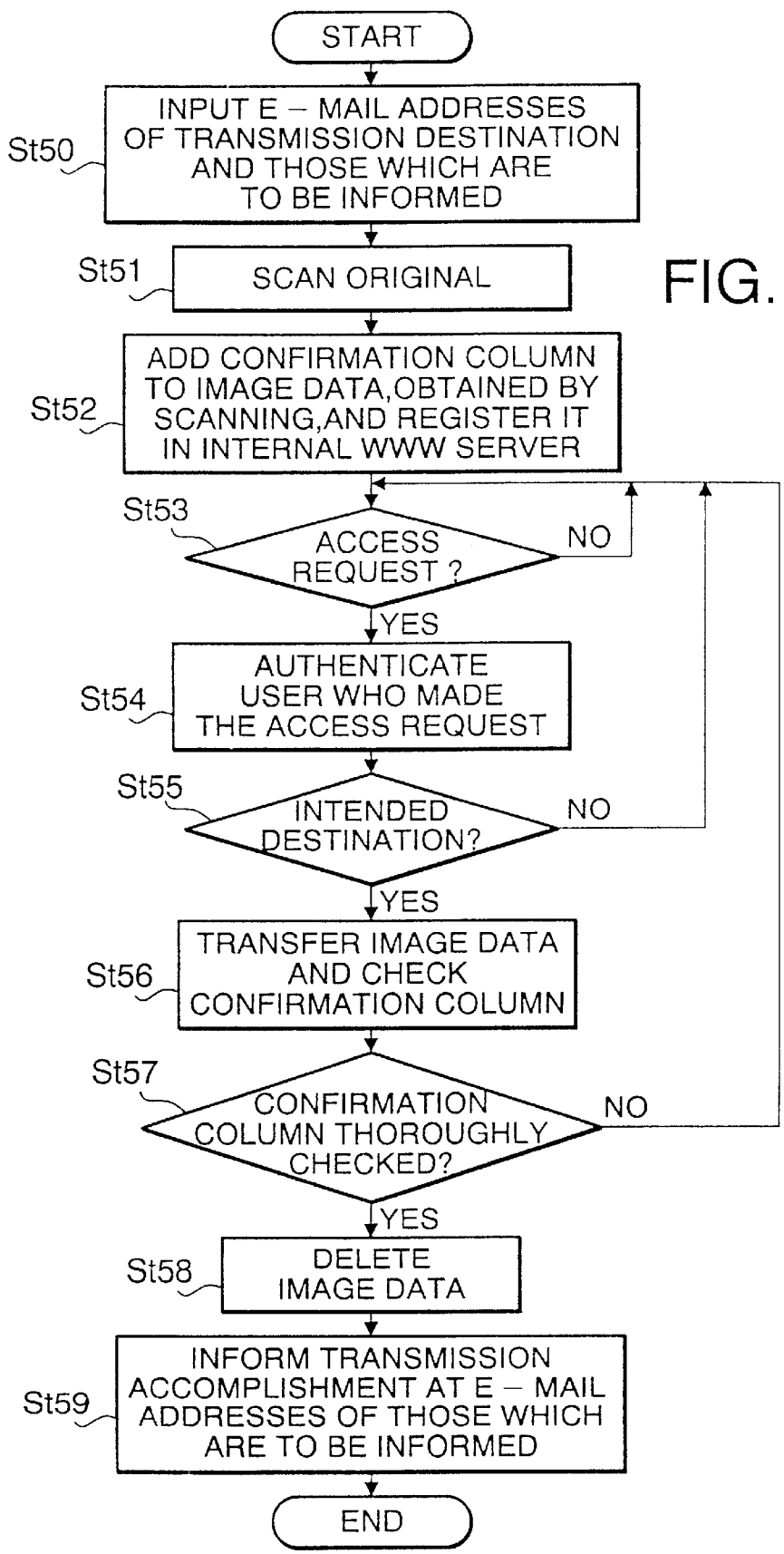
FIG. 20 is a flowchart of the sixth embodiment.

FIG. 20 is a flowchart which includes a process of informing the accomplishment of transmission.

The e-mail addresses of the transmission destinations are input and the e-mail addresses on the network of the information processing terminals which are to be informed of the accomplishment of transmission are input too (St 50). The e-mail addresses at which the accomplishment of transmission should be informed are given to the transmission accomplishment informing function 51.

The scanner section 16 scans the original (St 51) and registers its image data in the external storage 14 (St 52). At the time every transmission destination having accessed the image data in the external storage 14 is confirmed (St 53 to St 57), the access detector 45 reports such to the file deleting function 32 and the transmission accomplishment informing function 51.

Consequently, the file deleting function 32 deletes the image data from the external storage 14 (St 58), and the transmission accomplishment informing function 51 sends an e-mail indicative of the completion of transmission at the e-mail addresses to be informed (St 59).

Because the terminals which are requesting the acknowledgement of the accomplishment of transmission are informed of the accomplishment of transmission when the transmission of image data is completed, it is possible to know the sure transmission of data to where it should be sent at the place where the data has been registered.

Although the transmission accomplishment informing function is informed of the accomplishment of transmission on the condition that access has been acknowledged according to the sixth embodiment, modifications designed to inform the transmission accomplishment informing function of the accomplishment of transmission after reception of image reception information data indicating the reception of image data from the reception terminal 3 will be described individually. Programming should be designed in such a way that simple clicking of the reception confirmation screen affixed to image data at the reception terminal 3 allows access to the NETFAX 1 to inform the image reception information data.

In the NETFAX 1, the image reception information data which is sent back via the network from the reception terminal that has received the image data and access information data for access by the reception terminal 3 at the time of sending this image reception information data back to the NETFAX 1 are affixed to the image data saved in the external storage 14. When there is an access request from the reception terminal 3, data including the image reception information data and access information data is affixed to the image data and is transmitted together.

At the reception terminal 3, the reception confirmation screen shown at the end of the image data is clicked. When the reception confirmation screen is clicked, the image reception information data is transmitted to the NETFAX 1 based on the access information data that has been linked to this screen.

The NETFAX 1 recognizes the reception of the image data at the reception terminal 3 by identifying the image reception information data sent back from the reception terminal 3, and sends an e-mail whose content indicates the accomplishment of transmission to the e-mail address of the acknowledgment requesting device.

Seventh Embodiment

Figure 21:
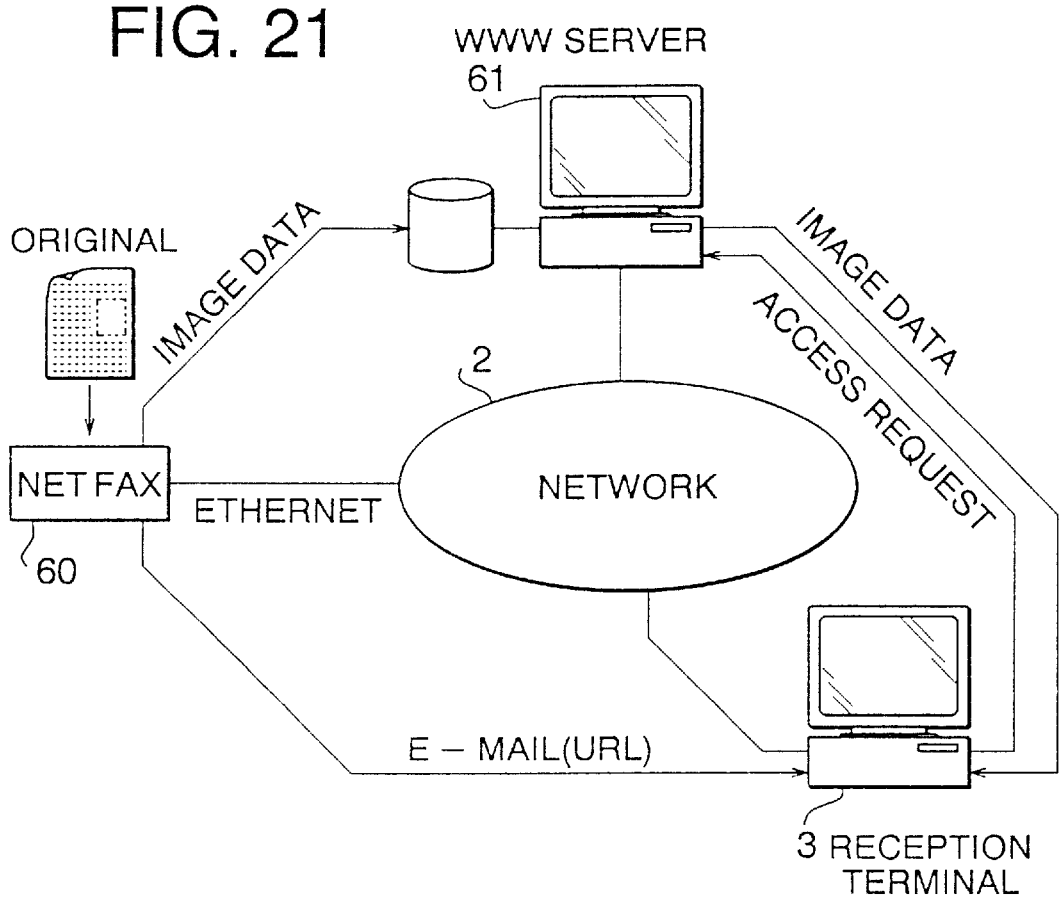
FIG. 21 is a schematic diagram of a facsimile communication system according to the seventh embodiment.

FIG. 21 is a system structural diagram of a facsimile communication system which has a server for image data located on a network.

In the above-described first to sixth embodiments, image data to be transmitted is registered in the external storage 14 equipped in the NETFAX 1 and the NETFAX 1 itself serves as a WWW server.

According to this seventh embodiment, the NETFAX does not itself have a function as a server, and an image is registered in a server which is operating on another host on a network, thereby accomplishing the same function of each embodiment discussed above.

A NETFAX 60 comprises the data compressor 21, the HTML document generator 22, the URL generator 23 and the informing e-mail generator 24, which are included in the functional blocks of the NETFAX 1 illustrated in FIG. 3. Further provided is a function of registering an HTML document of image data, generated by the HTML document generator 22, in a WWW server 61 on the network 2. The URL generator 23 generates a URL for access to the image data in the WWW server 61.

Figure 22:
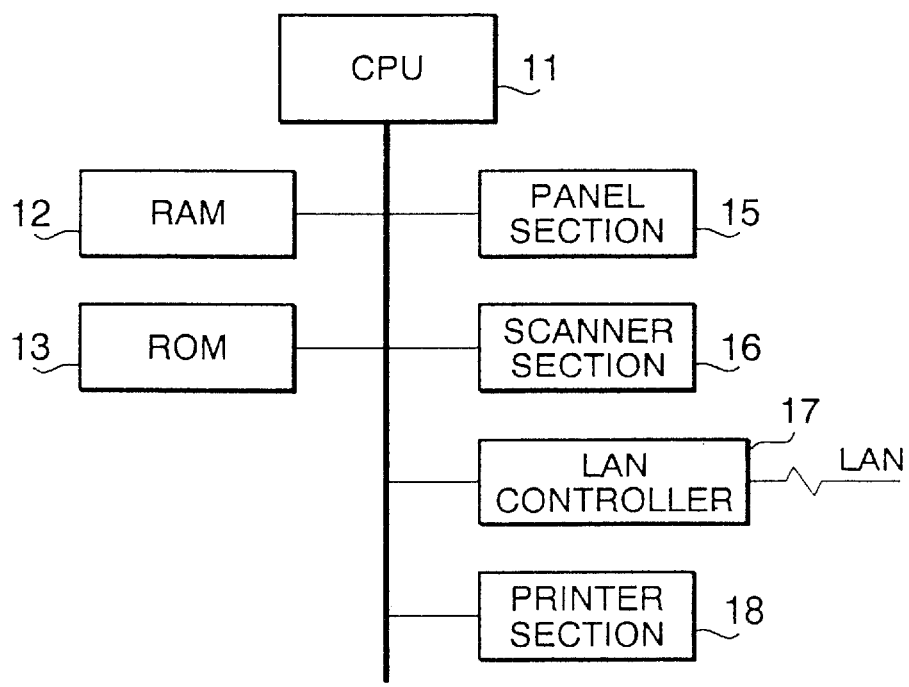
FIG. 22 is a functional block diagram of a NETFAX according to the seventh embodiment.

FIG. 22 shows the functional blocks of the NETFAX 60. As shown in this figure, the structure is the functional blocks shown in FIG. 2 from which the hard disk (external storage 14) is removed. This is because the NETFAX 60 need not have a large-capacity storage.

Figure 23:
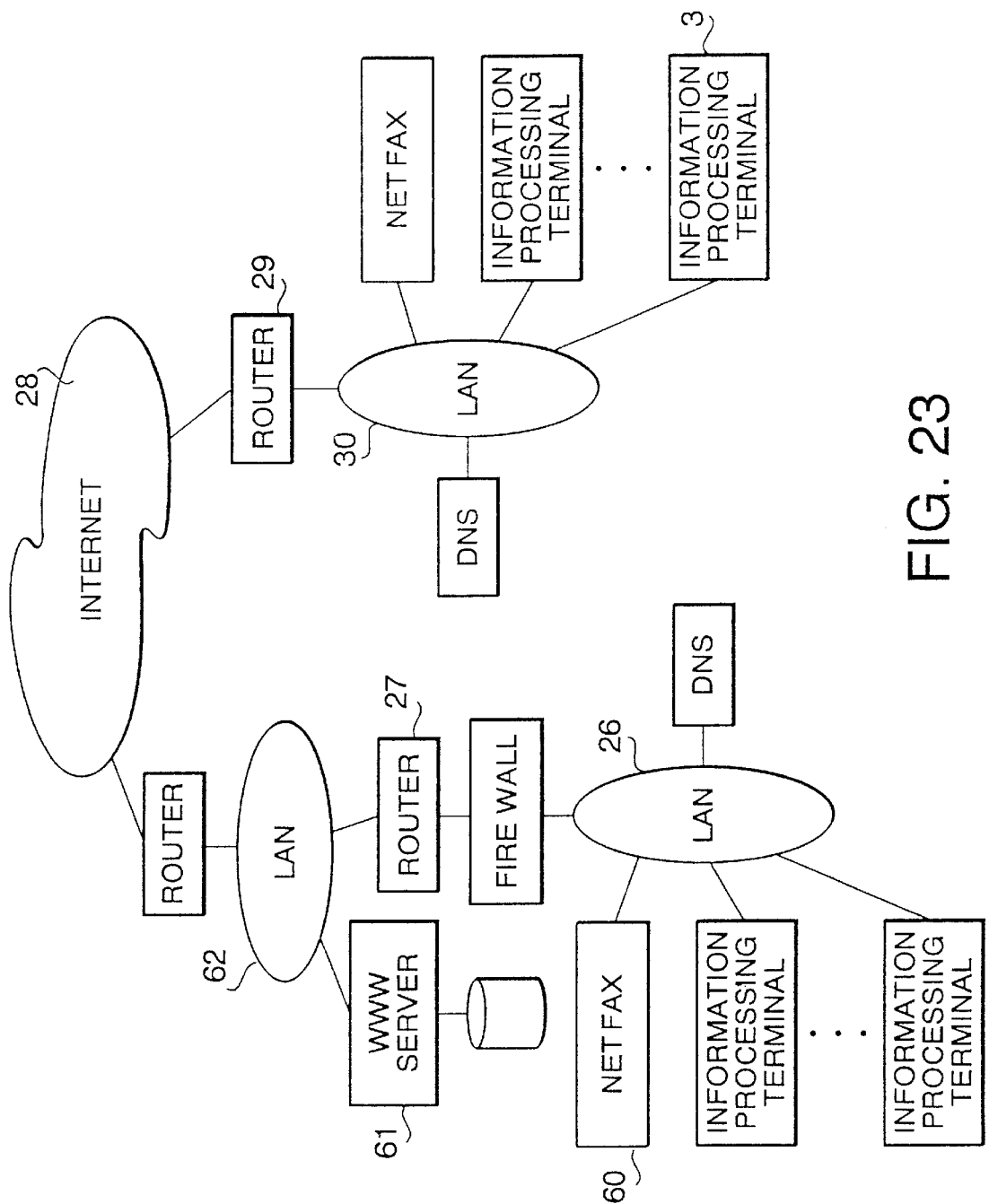
FIG. 23 is a diagram of a network structure.

FIG. 23 shows a network structure to which this embodiment is adapted. As shown in this figure, the NETFAX 60 is located on the LAN 26 and the WWW server 61 is located on a LAN 62. The WWW server 61 is located outside the fire wall provided at the entrance of the LAN 26 as viewed from the reception terminal 3.

If the LAN 26 on which the NETFAX 60 is located can be accessed directly by the reception terminal 3, the WWW server 61 may be placed on the LAN 26.

FIG. 24 is a flowchart for registering image data in the WWW server 61 provided on the network. When the NETFAX 60 identifies the e-mail address of the reception terminal 3 which has been input through the panel section 15 by an operator (St 61), the scanner section 16 scans the transmission original to convert it to image data (St 62) and the image data is registered in the form of an HTML document in the WWW server 61 on the network (St 63). Meanwhile, a URL for accessing the image data registered in the WWW server 61 is generated and sent by e-mail to the reception terminal 3 (St 64).

The reception terminal 3 receives the e-mail. The WWW server 61 is accessed by the HTTP using the URL in the e-mail for the acquisition of the image data without going through the reception site.

As discussed above, providing the host on the network with the server eliminates the need for a large-capacity storage in the NETFAX 60, so that the structure of the NETFAX 60 can be simplified.

Eighth Embodiment

In the same system structure as that of the seventh embodiment, a program which can accomplish display, modification, deletion, etc. of image data is attached to image data to be registered in the WWW server 61 and is registered together.

FIG. 25 is a flowchart up to the transmission of an e-mail for informing image data to the reception terminal 3. When the NETFAX 60 identifies the e-mail address of the reception terminal 3 which has been input through the panel section 15 by an operator (St 71), the scanner section 16 scans the transmission original to convert it to image data (St 72) and the image data is registered in the form of an HTML document in the WWW server 61 on the network (St 73). At this time, the program which handles the image data is affixed to the HTML document of the image data. Meanwhile, a URL for accessing the image data registered in the WWW server 61 is generated and sent by e-mail to the reception terminal 3 (St 74).

The reception terminal 3 receives the e-mail. The WWW server 61 is accessed by the HTTP using the URL in the e-mail for the acquisition of the program, which handles the image data, together with the image data.

At the reception terminal 3, as this program is invoked and is used together with the received image data, the image data can be displayed, modified and erased even if the reception terminal 3 does not have the function of processing image data. For example, the reception terminal 3 which does not have a viewer function can display image data saved in the WWW server 61.

It is to be noted that when access by the reception terminal 3 is detected in the WWW server 61, the program may be invoked on the server to erase data from the server 61 storing that data, or display the data in enlargement, or allow a password to be input.

Further, the same advantages can be obtained by providing the WWW server 61, located on the network, with the file deleting function, user authentication function and transmission accomplishment informing function, which have been explained in the above-described second to sixth embodiments, singularly or in any combination.

Although the foregoing description has been given mainly with reference to the case where the transmission original is scanned by the NETFAX 1 or 60 and the e-mail address is input through the panel section 15 by an operator, it may be likewise applied to the case where the NETFAX 1 or 60 relays image data, received from the public telecommunication network, to the reception terminal 3. In this case, the e-mail address of the transmission destination can be designated by the subaddress of the ISDN line.

Ninth Embodiment

Figure 26:
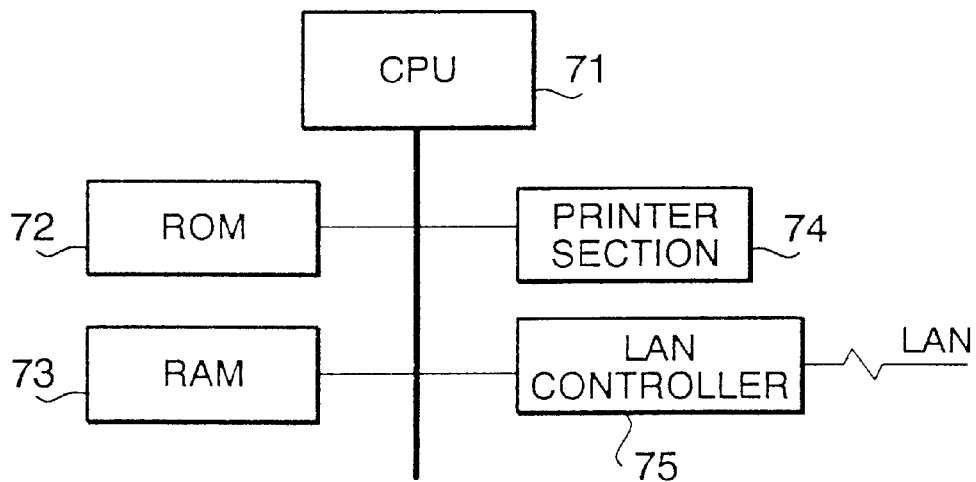
FIG. 26 is a functional block diagram of an information processing terminal according to the ninth embodiment.

FIG. 26 shows the functional blocks of an information processing terminal which is used as the reception terminal 3 in the above-described first to eighth embodiments. It comprises a CPU 71 which controls the apparatus, a ROM 72 where a program is stored, a RAM 73 which is used for data for the program, a printer section 74 which prints received image data, and an LAN controller 75 which executes data transmission and reception via a network.

Figure 27:
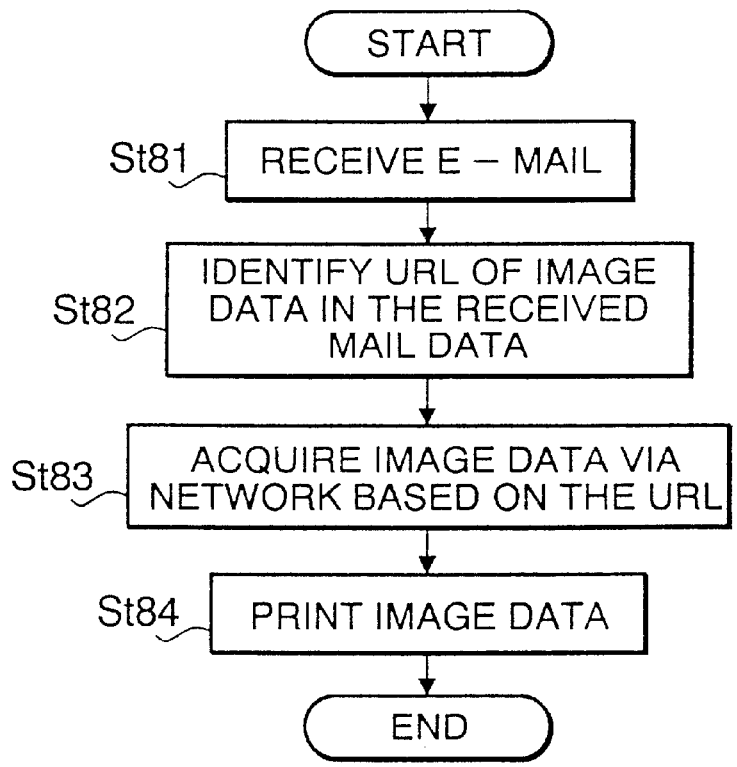
FIG. 27 is a flowchart of the ninth embodiment.

FIG. 27 is a flowchart for acquiring image data from the NETFAX 1 or the WWW server 61. First, an e-mail is received from the sender (St 81). A URL indicative of the location of the content of image data is identified in the received e-mail (St 82). Using this URL and according to the HTTP, the NETFAX 1 or the WWW server 61 which has the target image data is accessed and image data is received from there (St 83). Thereafter, it is printed by the printer section 74 to acquire the intended original.

Figure 28:
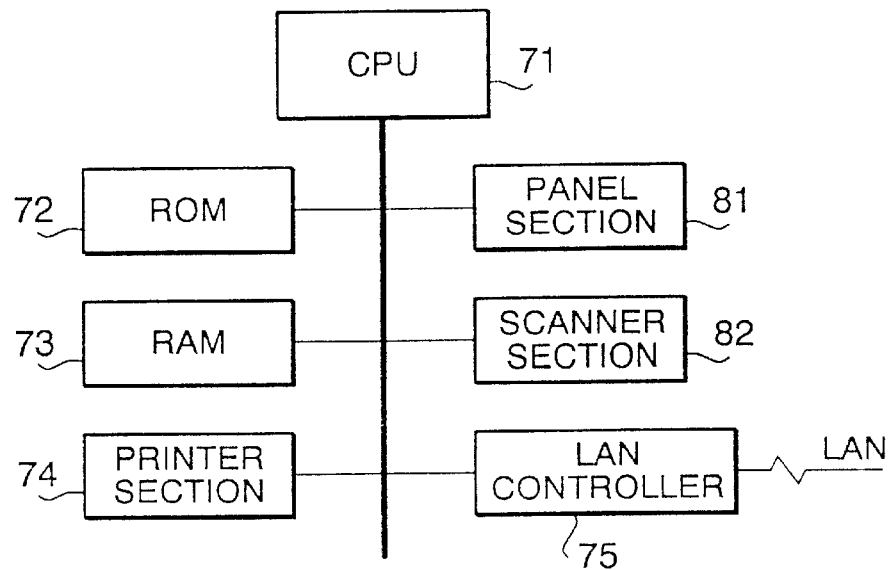
FIG. 28 is a functional block diagram when an information processing terminal is a NETFAX.
Figure 29:
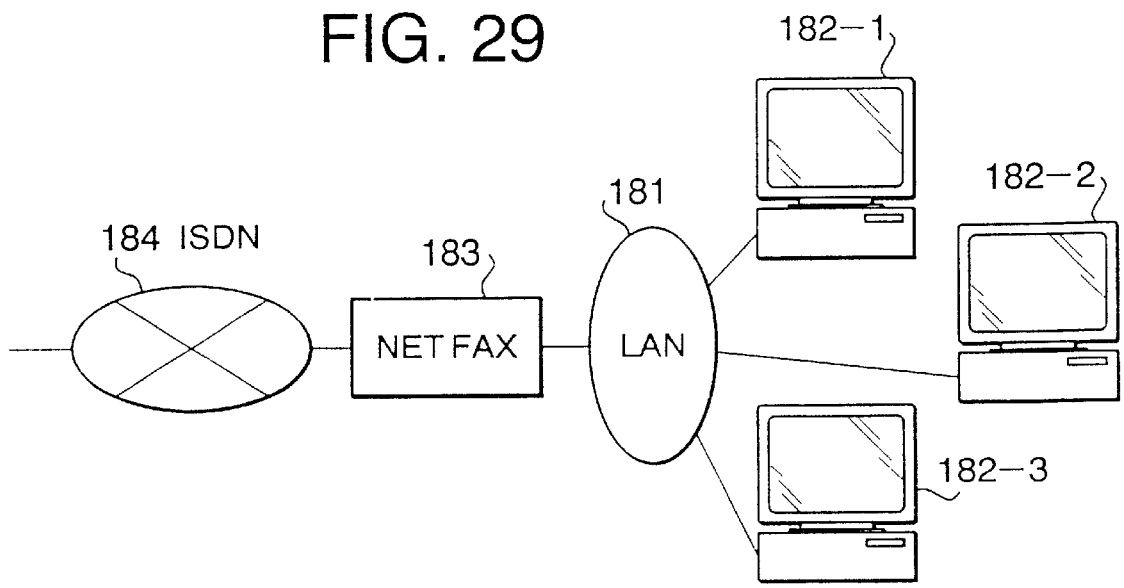
FIG. 29 is a diagram exemplifying a conventional facsimile communication system.

FIG. 28 shows functional blocks when the reception terminal 3 is a NETFAX. It comprises a panel section 81 for inputting a telephone number or the like, and a scanner section 82 which scans a transmission original.

Although the foregoing description has been given of the transmission of image data in facsimile communications, this invention is not limited to facsimile communications. It is also adapted to the transmission of data with a large data size, such as a moving picture, audio information or large-capacity text data.

In the network structure illustrated in FIG. 5, audio information or moving picture information saved on a hard disk of an information processing terminal which belongs to the LAN 26 is transmitted to a single or a plurality of information processing terminals via the LAN 26 or the Internet 28.

When there is generated audio information, moving picture information or still picture information to be transmitted from an information processing terminal which becomes a transmission node to another information processing terminal which becomes a reception node, the audio information, moving picture information or still picture information is saved in the storage of the information processing terminal which becomes the transmission node or in the storage on the network, and a URL for access to the data in the storage is prepared and sent by e-mail to the e-mail address of another information processing terminal which becomes the reception node.

When the data put on an electronic bulletin board on a company LAN has a large size, the data is saved on the hard disk of a server located on the LAN and a URL for accessing data saved in the server is transmitted by e-mail to multiple clients on the LAN. In this case, the data is registered in the server and the terminal which executes multi-casting of the URL becomes the transmission node and the clients become the reception nodes.

INDUSTRIAL APPLICABILITY

This invention is a data communication method suitable for transmitting still pictures, moving pictures, sounds or text data, which is too large to transmit by e-mail via a network.

What is claimed is:

1. An in image transmission apparatus comprising:
   a storage that stores an image to be transmitted to at least one recipient;
   a transmission section that transmits the image in the storage along with a program to the at least one recipient across a communication network, the program having a procedure for displaying an input image on a screen of the recipient when the recipient receives said image, and for transmission of a notification indicative of the reception of the image to the image transmission apparatus when a part of the displayed input image is clicked on;

a reception section that receives the notification transmitted from the recipient across the communication network; and a confirmation section that utilizes the received notification to confirm a reception of said image.

2. The image transmission apparatus according to claim 1, wherein said transmission section and said reception section are comprised of a WWW server, and the WWW server transmits the image along with the program to the recipient by a communication protocol of a point-to-point data transfer upon reception of the request from the recipient.

3. The image transmission apparatus according to claim 2, further comprising:

a URL generating section that generates URL used to directly request the image to the WWW server after the image is stored in said storage, said URL including a host name of said WWW server on the communication network, and a file name associated with the image stored in said storage; and a mailing section that mails an e-mail to indicate presence of an image to be received, the e-mail comprising a header including an e-mail address of the recipient as a destination address, and a body including the generated URE and not including the image.

4. The image transmission apparatus according to claim 2, wherein the program includes a URL of said WWW server, and uses the URL to access the WWW sever when a part of the displayed input image is clicked on.

5. The image transmission apparatus according to claim 3, further comprising:

a deleting system that deletes the image saved in said storage, wherein said mailing section sends the e-mail to a plurality of recipients when a multi-cast is designated, and said deleting system deletes said image saved in said storage upon confirmation that all recipients to which multicast of the e-mail has been made, have accessed the image.

6. The image transmission apparatus according to claim 1, further comprising:

a measuring system that measures an elapsed time since saving of the image in said storage; and a deleting system that deletes the image saved in said storage after the elapsed time exceeds a predetermined time.

7. The image transmission apparatus according to claim 1, further comprising:

a checking system that checks if a reception terminal, which has made an access request for the image saved in said storage, has an access right; and a permitting system that permits the recipient, which has been determined to have an access right, to access the image.

8. An image receiving apparatus comprising:

a reception section that receives an image with a program from a sender across a communication network;

a screen that displays the received image;

a processor that executes the program to display an input image on said screen when the received image has displayed on said screen; and a transmission section that transmits a notification indicative of reception of the image to a WWW server via the communication network when a part of the displayed input image is clicked on.

9. The image receiving apparatus according to claim 8, wherein the program includes a URL of the WWW server to transmit the notification to the WWW server.

10. An image transmission method comprising:

saving an image to be transmitted to at least one recipient in a storage;

transmitting the image in the storage along with a program to the at least one recipient across a communication network, the program having a procedure for displaying an input image on a screen of the recipient when the recipient receives the image, and for transmission of a notification indicative of the reception of the image, to the image transmission apparatus, when a part of the displayed input image is clicked on;

receiving the notification transmiffed from the recipient across the communication network; and utilizing the received notification to confirm a reception of the image.

* * * * *